Jan. 11, 1938.  H. N. HERRICK  2,104,743
METHOD OF CORRELATING SUBSURFACE STRATA
Filed Jan. 25, 1937
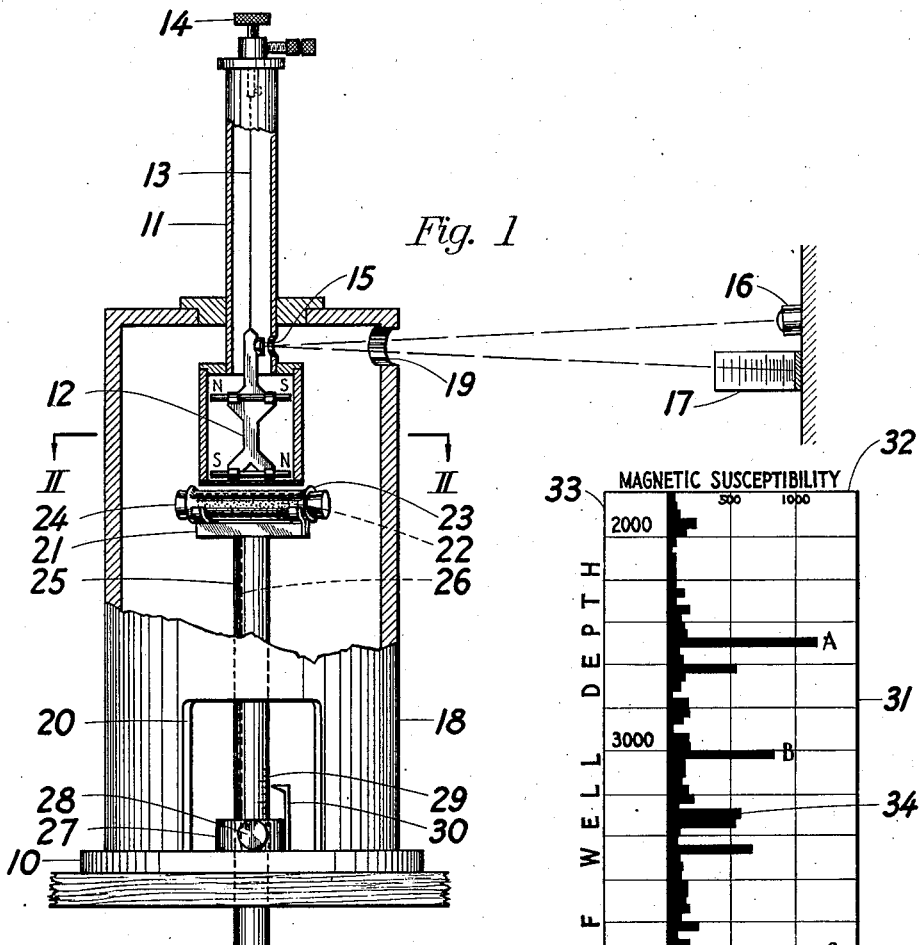
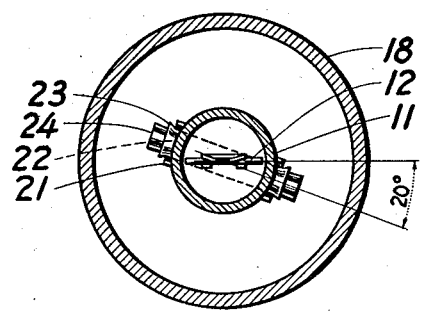
Fig. 2
Inventor
HENRY N. HERRICK
by J. H. Adams
Attorney Patented Jan. 11, 1938

2,104,743

UNITED STATES PATENT OFFICE 2,104,743

METHOD OF CORRELATING SUBSURFACE STRATA

Henry N. Herrick, Berkeley, Calif., assignor to Standard Oil Company of California, San Francisco, Calif., a corporation of Delaware Application January 25, 1937, Serial No. 122,187

4 Claims. (Cl. 175—182)

This invention relates to improvements in methods of correlating subsurface strata, as they may be encountered by the drilling of one or more wells, by a comparison of distinctive and determinable characteristics of samples of the said strata, and particularly refers to the correlation of strata by a comparison of the magnetic susceptibilities of the same.

In the drilling of wells, especially in drilling for oil or gas, it is very desirable to obtain information about the sequence, existence, and position of the geological strata penetrated by the drill, and to be able to correlate those data with similar information obtained from adjoining and distant wells. Successful correlations give an accurate and very valuable indication as to subsurface conditions at points between the wells or bore holes, as well as in the surrounding areas.

Attempts have been made to correlate strata by microscopic analysis and comparison of the minute fossils they contain, as well as proportions of certain heavy minerals, which form so-called "marker beds". These methods involve a careful preparation and microscopic examination of samples and not only require skilled operators and elaborate equipment, but a long and tedious period of time, so that but few determinations can be made in a day and at a considerable cost. Also a large proportion of strata have no distinctive marker beds or forams, so that many feet of cores must be laboriously examined to find a small portion that may be usable for this purpose.

This invention involves the utilization, for correlation purposes, of a hitherto unused property of a sample of subsurface strata, namely, its magnetic susceptibility, and has been found to be of great commercial value in such correlation procedure.

It is appreciated that the magnetic properties of cores and samples of cuttings from subsurface strata have been determined, and attempts have been made to determine the relationship between such measurements and the results of magnetic field intensity surveys carried out at the surface of the earth to locate tectonic structures which may be favorable to the accumulation of oil, gas, salt, metallic and particularly ferrous ores and the like. Such are discussed in some detail in the publication "Geophysical Prospecting" published in 1934 by the American Institute of Mining and Metallurgical Engineers, particularly in the section entitled "A Method for Determining Magnetic Susceptibility of Core Samples".

Reference is therefore made to that publication for the various well known forms of apparatus and technique of operation to perform such measurements, as will be supplemented by a further description of a preferred mode of operation and equipment therefor in the following specification.

It is an object of this invention to provide an improved method of locating, identifying, and correlating subsurface formations so that they may be distinguished and identified at a plurality of points at which they may be intersected by well bores from which samples may be retrieved.

Another object is to provide an improved method of correlating well logs and cores from adjoining wells by a comparison of the magnetic susceptibilities of the said cores.

Another object is to provide an improved method of correlating or identifying subsurface tectonic formations by a direct comparison of the magnetic susceptibilities of the materials of which they are composed.

Another method is to provide a simple, rapid and economical method of correlating marker beds by a comparison of their magnetic properties, that may be practiced by relatively unskilled operators and with a minimum of mathematical computations.

These and other objects and advantages of this invention will be more fully apparent from the following description of the method and from the accompanying drawing, which forms a part of this specification and illustrates a preferred form of apparatus by means of which the step of measuring of the relative magnetic susceptibilities of the samples may be carried out.

In the drawing, Figure 1 is a vertical and part sectional view of an apparatus which may be used to measure magnetic susceptibility of a sample of core material.

Figure 2 is a horizontal sectional view on line II—II of Figure 1, and illustrates the preferred relation between the normal magnetic axis of the magnetic system and the sample holder.

Figure 3 shows a sample chart or log of a well bore on which has been superimposed a record of the magnetic susceptibility of the strata traversed, and indicating, as at A, B, C, etc., the distinguishing strata or magnetic marker beds that may be correlated with similar data from another well.

Referring to the drawing, and particularly to Figure 1, a torsion type magnetometer or magnetic balance is generally indicated at 10, and comprises a brass or other non-magnetic metal case 11 in which is suspended an astatic magnetic system 12, by means of a torsion wire 13, which may be adjusted by head 14. A mirror 15 is secured to the magnetic system and is adapted to cooperate as shown with a light beam from lamp 16 and conventional arcuate scale 17 to indicate the deflection of the magnetic system.

Magnetic system 12 is preferably supported by and enclosed in a heavy steel or iron shield 18 in which are suitable openings 19 and 20, for the light beam from the mirror 15 and for the manipulation of the sample carrier 21, respectively. The sample 22 of the core or other sample of the material whose magnetic susceptibility is to be determined is preferably pulverized in a nonmagnetic vessel, such as a porcelain mortar, to pass a fine screen, say 40 mesh. A precisely measured amount, say 30 grams, is placed in a glass tube 23 of about 21 mm. bore and 11.5 cm. length, and the ends are closed by corks 24.

The holder or carrier 21 for the sample is preferably formed of wood or other non-magnetic material and may be in the form of a V-block as shown. It is supported on a non-magnetic shaft 25, secured against rotation as by a spline or keyway 26 and is adapted to be raised or lowered within shield 18 so as to place sample 22 in a predetermined position vertically spaced a reproducible distance from magnetic system 12, and also, as shown in Figure 2, preferably angularly displaced from the axis of the magnetic system a given and reproducible amount, say 20°, to obtain a maximum deflection. A boss 27 in the base of shield 18 is provided with a screw 28 to clamp shaft 25 in the desired position, while a scale 29 and pointer 30 may be calibrated to indicate the spacing between the sample 22 and the magnetic system 12, for a purpose which will be explained below.

The magnetometer may be calibrated to give susceptibility in terms of scale deflection in centimeters on scale 17 by the use of glass tubes 23 filled with standard solutions of ferric chloride ($FeCl_3$) of known susceptibility. It has been found convenient to use four samples; 100% crystalline, and 75%, 50% and 25% solutions, having a susceptibility of $260 \times 10^{-6}$, $190 \times 10^{-6}$, $130 \times 10^{-6}$, and $65 \times 10^{-6}$, respectively.

Some samples of subsurface strata possess a markedly high degree of susceptibility, over $2000 \times 10^{-6}$, while some may be as low as $20 \times 10^{-6}$, so it is desirable to calibrate the light beam scale 17 accurately with different spacings between the calibrating $FeCl_3$ sample and the magnetic system 12, as indicated by the scale 29 and pointer 30. It will be found that the deflection of the beam on scale 17 will be substantially inversely proportional to the square of the distance between the sample and the magnetic system.

In operation, the cores or other samples of subsurface strata obtained during the drilling of a well, or thereafter, by well known methods, are carefully pulverized, screened, weighed and placed in tube 23, which is raised to a known distance from the magnetic system 12 by shaft 25 and carrier 21. The sample will have no polarity due to its heterogeneous arrangement, even though some of its components may be individually polarized. It will, however, be found to be measurably susceptible to the effect of the external magnetic field of the externally shielded astatic magnetic system 12, and will produce a reaction on that system that will be indicated on scale 17 by the deflection of mirror 15 and the light beam from lamp 16.

The values of magnetic susceptibility thus found may be illustrated or plotted graphically as is indicated on chart 31 of Figure 3, at the corresponding depth at which the samples were found in the earth, as shown respectively by the scales 32 and 33. The graph 34 thus formed is the final product of the steps or operations thus far performed. It will be noted that certain strata will have definite and recognizable characteristic magnetic susceptibility values, A, B, C, . . . F, and, from their distinctive grouping, position, and magnitude, may be easily identified on the similar graphs made from samples from adjoining and even somewhat distant well bores. From these comparisons, valuable data and inferences may be obtained regarding the slope or dip of certain strata, their presence or absence, thickness, relative depth, and many other types of information that are of interest to those skilled in this art.

It will, therefore, be appreciated that a new and valuable method of correlating subsurface strata and formations has been developed, utilizing the peculiar and distinctively characteristic values of magnetic susceptibility of samples or groups of samples obtained from a well bore to identify formations and materials having otherwise indistinguishable characteristics. Although but one type of apparatus is disclosed as being useful for carrying out the measuring step of this method, it will be appreciated that many other types are available, as has been referred to above. It will also be recognized that actual plotting of the values need not be carried out, as a mere inspection of the tabulated quantities will often give the required information and correlation.

I claim:

1. The method of correlating subsurface strata which comprises the steps of measuring the magnetic susceptibility of a succession of samples of subsurface strata from a bore hole intersecting the same, measuring the magnetic susceptibility of a succession of samples of subsurface strata from a second bore hole at a distance from said first bore hole and comparing the results so found to identify similar characteristics of the strata in or adjacent the said bore holes.

2. The method of correlating subsurface strata which comprises the steps of measuring the magnetic susceptibility and the depth of a succession of samples of subsurface strata from a bore hole intersecting the same, measuring the magnetic susceptibility and the depth of a succession of samples of subsurface strata from a second bore hole at a distance from said first bore hole, and comparing said magnetic values and said depth values to determine the characteristics of the strata in or adjacent said bore holes.

3. The method of correlating subsurface strata lacking in distinctive physical components or characteristics which comprises the steps of measuring the magnetic characteristics of consecutive samples from a bore hole, measuring the magnetic characteristics of consecutive samples from a second bore hole and comparing the said characteristics to identify strata intersected by both of said bore holes.

4. The method of correlating subsurface strata which comprises the steps of measuring the magnetic properties of samples from a series of otherwise unidentifiable strata and comparing the values thus found with values of magnetic properties of samples from a second series of strata so that strata common to both series may be identified.

HENRY N. HERRICK.